US008782099B2

(12) United States Patent
Lampinen et al.

(10) Patent No.: US 8,782,099 B2
(45) Date of Patent: *Jul. 15, 2014

(54) GRAPHICAL OBJECTS BONDING SOCIETY SYSTEM AND METHOD OF OPERATION FOR A GAME

(71) Applicants: Kenneth Ellis Nichol Lampinen, Espoo (FI); Timo Tapani Koponen, Espoo (FI); Harri Koponen, Stockholm (SE)

(72) Inventors: Kenneth Ellis Nichol Lampinen, Espoo (FI); Timo Tapani Koponen, Espoo (FI); Harri Koponen, Stockholm (SE)

(73) Assignee: MyGobs Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,898

(22) Filed: Feb. 15, 2013

(65) Prior Publication Data

US 2013/0151518 A1    Jun. 13, 2013

Related U.S. Application Data

(63) Continuation of application No. 13/478,143, filed on May 23, 2012, now abandoned, which is a continuation of application No. 12/813,539, filed on Jun. 11, 2010, now Pat. No. 8,195,719.

(51) Int. Cl.
*G06F 17/30* (2006.01)

(52) U.S. Cl.
CPC .... *G06F 17/30002* (2013.01); *G06F 17/30067* (2013.01); *G06F 17/30011* (2013.01); *G06F 17/30861* (2013.01); *G06F 17/30286* (2013.01)
USPC ........... 707/805; 707/626; 707/634; 707/794; 707/795; 707/802; 707/803; 707/804; 209/201; 209/203

(58) Field of Classification Search
USPC ......... 707/805, 626, 634, 795, 794, 802, 803, 707/804; 709/201, 203, 213, 217; 715/200, 715/700, 733–734, 744, 748, 764
See application file for complete search history.

(56) References Cited

U.S. PATENT DOCUMENTS 5,414,899 A * 5/1995 Raetz ............................. 16/380
5,557,731 A * 9/1996 Li et al. ............................ 1/1

(Continued)

FOREIGN PATENT DOCUMENTS

EP          1973343 A1    9/2008
WO     WO0017792 A1    3/2000

(Continued)

OTHER PUBLICATIONS

Facebook: Wikipedia May 31,2010 [haettu May 9, 2011]. Haettu Internetistä.

(Continued)

*Primary Examiner* — Frantz Coby
(74) *Attorney, Agent, or Firm* — Seppo Laine Oy; Joshua P. Wert

(57) ABSTRACT

The present inventions relates to an Internet service based on two fundamental beliefs, first that identity on the Internet and in real life is substantially based on a individual's or organization's relationship to other people, objects, places, spaces, and organizations and second that individuals or organizations themselves should create, manage and control that identity. Based on these beliefs the present invention offers the Internet's leading tools, services and ecosystem that enables individuals and organizations to intuitively create and manage their identity based on relationships, effortlessly customize their internet experience to fit that identity and empower themselves to use that identity for benefit in their real life.

15 Claims, 1 Drawing Sheet

(56) References Cited

U.S. PATENT DOCUMENTS

| | | | |
|---|---|---|---|
| 6,073,163 A * | 6/2000 | Clark et al. | 709/203 |
| 6,266,649 B1 | 7/2001 | Linden | |
| 6,490,581 B1 * | 12/2002 | Neshatfar et al. | 1/1 |
| 6,636,863 B1 * | 10/2003 | Friesen | 1/1 |
| 6,732,109 B2 * | 5/2004 | Lindberg et al. | 707/797 |
| 6,978,269 B1 * | 12/2005 | Johnson et al. | 1/1 |
| 7,627,517 B2 * | 12/2009 | Badenhorst et al. | 705/37 |
| 7,668,608 B2 * | 2/2010 | Nixon et al. | 700/87 |
| 7,669,123 B2 | 2/2010 | Zuckerberg et al. | |
| 7,676,756 B2 * | 3/2010 | Vedula et al. | 715/763 |
| 7,904,825 B2 * | 3/2011 | Penke et al. | 715/772 |
| 8,073,846 B2 * | 12/2011 | Dangberg et al. | 707/724 |
| 8,161,399 B2 * | 4/2012 | Kannan et al. | 715/764 |
| 8,195,719 B2 * | 6/2012 | Lampinen et al. | 707/805 |
| 2002/0161772 A1 * | 10/2002 | Bergelson et al. | 707/100 |
| 2005/0010589 A1 | 1/2005 | Novak et al. | |
| 2007/0179863 A1 | 8/2007 | Stoll | |
| 2008/0281915 A1 | 11/2008 | Elad et al. | |
| 2009/0287714 A1 | 11/2009 | Vasudevan et al. | |
| 2010/0121890 A1 * | 5/2010 | Perkins et al. | 707/805 |

FOREIGN PATENT DOCUMENTS

| | | |
|---|---|---|
| WO | WO0175542 A2 | 10/2001 |
| WO | WO0210954 A2 | 2/2002 |
| WO | WO2004051525 A1 | 6/2004 |

OTHER PUBLICATIONS

Fl search report of Apr. 18, 2011.
Fl search report of May 11, 2011.
Tinter J. "Enhanced Cooperation with Facebook on Search", Feb. 5, 2010 [haettu May 6, 2011]. Haettu Internetistä.

* cited by examiner

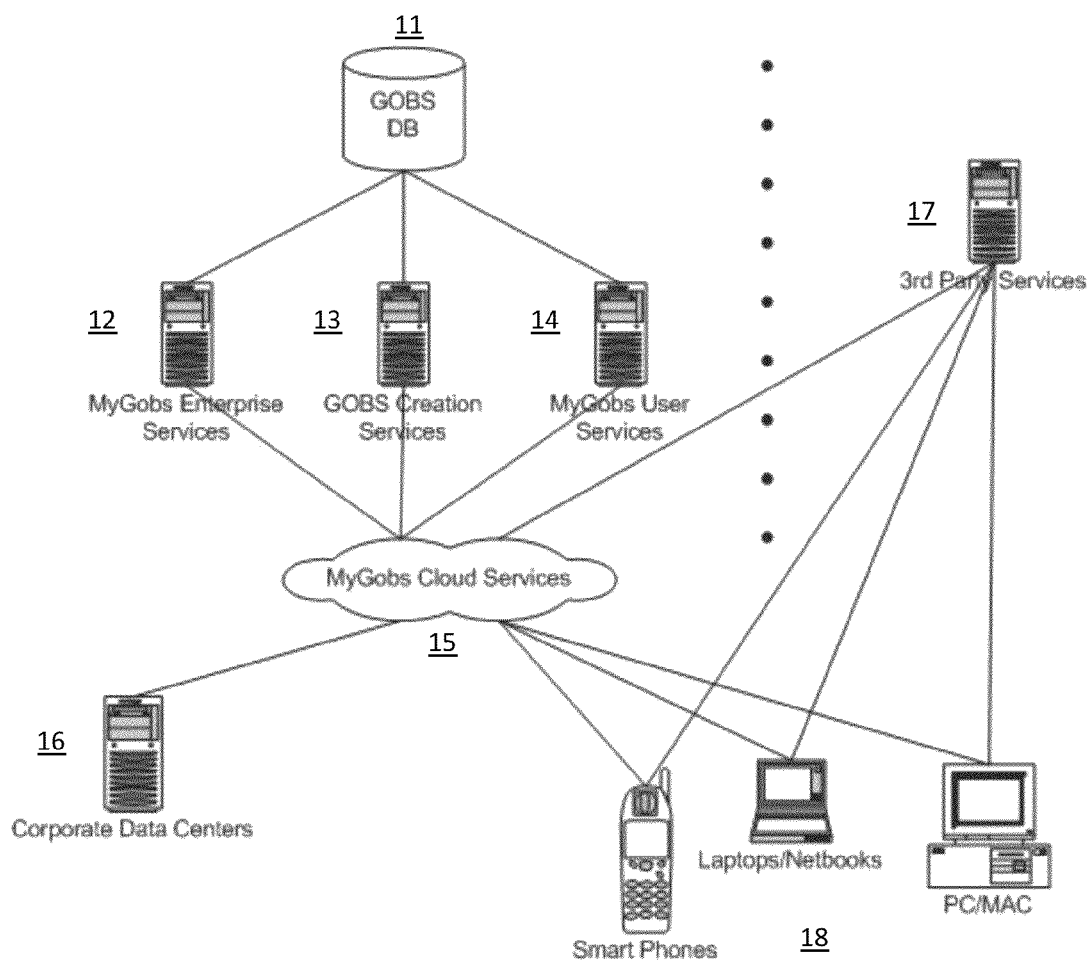

GRAPHICAL OBJECTS BONDING SOCIETY SYSTEM AND METHOD OF OPERATION FOR A GAME

BACKGROUND OF THE INVENTION

1. Field of the Invention

The internet contains an ever increasing amount of information directed to people, places and things. As the amount of information increases, it has become increasingly difficult for individuals and organizations to easily find desired information. While there are a number and variety of internet search engines and social networking sites, it remains increasingly difficult and time consuming to sift through search results and updates to find desired or even relevant information. Therefore, the present invention provides a novel approach to collecting, bundling and displaying information so that it is relevant to an end-user.

2. Description of Related Art

Historically, if a user would like to find some specific information on the internet they would go to a search engine of their choice and type in some key words. The search engine then searches all of the web pages available to it and provides the user with a list of pages containing the key words typed in. Most search engines are then capable of ranking the pages displayed based on a variety of criteria such as most relevant, most recent, most popular, etc.

The problem with keyword searching is that it often returns to the user a number of pages that have no relevance to the user but which contain the keywords entered. This is either because the keywords are used in a variety of contexts, or because it is popular for web pages to list a large number of frequently used keywords so that they will be displayed to users as often as possible. In order for a user to find the desired information may take several iterations of keywords or may take clicking through a large number of pages returned as matching keywords.

More recently, users are obtaining information from places like status updates, news feeds, or RSS feeds. Instead of a user searching for information, a user is able to monitor feeds of information from friends or organizations which they subscribe to merely check. While this information tends to be somewhat more relevant to a user than results from a search engine, the information is often incomplete or there is simply too much to processes and easily keep track of.

Additionally, while some information on a feed is extremely relevant and interesting to some users, it is only moderately relevant or annoying to other users who also subscribe or check the feed. This can cause some users to generally ignore an organizations feed although it does contain some useful information for them.

Currently, there does not exist a platform for compiling truly relevant information for a user, that is searchable, expandable and up-to-date, let alone one which also pushes only useful, relevant information and updates to an end-user.

The present invention aims to provide a product and method for addressing at least some of the deficiencies of the existing technology.

SUMMARY OF THE INVENTION

The present invention relates generally to an Internet service based on two principles. First, that identity on the Internet and in real life is substantially based on a individual's or organization's relationship to other people, objects, places, spaces, and organizations. Second, that individuals or organizations themselves, not governments, corporations, or anyone else, should have the ability to create, manage and control that identity.

Based on these principles, it is an aspect of the present invention to provide the Internet's leading tools, services and ecosystem which enable individuals and organizations to intuitively create and manage their identity based on relationships. It is a further aspect of the present invention to provide a product and method which allows users to effortlessly customize their internet experience to fit that identity and empower themselves to use that identity for benefit in their real life.

Through the aspects above, the present invention will improve the end-user's social networking experience, deliver highly relevant content and media through search and exploration, deliver a platform for non-intrusive and relevant advertising (especially important in mobile) with integrated e-commerce, and deliver insight to users about themselves and to the world about current trends.

The present disclosure utilizes the following unique terms:

"GOBS" is an acronym for Graphical Objects Bonding Society. For simplicity's sake, the plural of these objects will be referred to as GOBS and the singular of these objects as a gob. GOBS are graphical representations of people, objects, places, spaces, and organizations that bundle various data across the internet into a single object that can easily be acted upon (i.e., collected, purchased, etc.). GOBS may also have unique characteristics separate from other information available on the Internet such as history, code that allows the gob to interact with other GOBS, code that allows for actions relating to the gob, etc. A more thorough description of GOBS will follow.

To "gobify" is the process of turning things (both real world and virtual) into GOBS.

A GOBS Network refers to a user's collection of GOBS out to the third-level (i.e., friends of friends of friends).

The present invention has a broad scope of applicability. It is specifically useful to individuals, organizations and advertisers, although its usefulness extends to a much broader range of users.

Individuals

The present invention offers an ecosystem that enables individuals to use those relationships important to them to intuitively customize their internet experience and empower themselves in real life. It enables users to deepen relationships with people that matter, benefit from belonging to organizations, more easily find, understand and act on information, and leverage their experience and relationships for their own benefit.

Some example ways which users can benefit from the present invention are as follows:

1) Create yourself by collecting GOBS. GOBS can be selected from a catalog of existing GOBS (and customized if desired), created by the user himself, or selected from automatic suggestions based on their current collection and/or those of their network. Once GOBS are added to the collection they begin to influence the users experience and the experience of their GOBS network.

2) Communicate and share with the people that matter. The present invention enables intuitive, flexible, on-the-fly sharing of a users GOBS, with their GOBS, whether they are people, objects, organizations, places, or spaces.

3) Get search results that are more relevant. Search results are prioritized by a users collection of GOBS and those of their GOBS network. If they cannot find what they need by conventional searching, they can extend their search via anonymous polling of their relationships, out to 3 levels removed (i.e. Friends of friends of friends.)

4) See the information that matters by prioritizing Web 2.0 services such as RSS, Facebook and Twitter feeds. Intuitively set up different group feeds with only the users or feeds they want to see, across different services.

5) Make money by sharing the things that are important to the user. An aspect of the present invention allows people to view a users collection of GOBS and provide the user with money from click-through advertising and micro-transactions. The user can determine which collections of GOBS they want to display and the level of commercial activity they wish to engage in.

Organizations

The present invention also has many benefits for organizations as it enables organizations to easily recruit, communicate, organize and impact the lives of its members and customers. Examples of organizations are clubs, NGO's, small businesses, network marketing companies, non-profit organizations, religious organizations, service providers, etc. Organizations can be, but do not have to be, advertisers.

Some example ways which organizations can benefit from the present invention are as follows:

1) Organizations can create a spaces gob to provide tiered communications with their members. Members of an organization can be grouped into different, customizable levels and/or branches, which can be determined by their relationship to other members, and which in turn will determine access to the information that is shared and/or pushed.

2) Organizations can specify GOBS, web pages and web services that influence the prioritization of search results for its members, enabling members to more easily find the things that are most relevant to them as organization members.

3) Organizations can establish virtual stores of their goods and services. Users can directly purchase goods and services from this storefront. Users can also add GOBS from a store to their own collections for free. These GOBS retain their link to the store from which they were collected, enabling customers to easily become spokesmen for a product and service from a particular distributor. Virtual stores can also enable customer service via real time chat.

Advertisers

The present invention also enables advertisers to easily gobify their products or services, track their market and the sales impact of various marketing efforts.

Some example ways which advertisers can benefit from the present invention are as follows:

1) Advertisers can easily convert their product catalog to GOBS, enabling word-of-mouth advertising, product placement advertising, and online purchasing of their products through members of their distribution networks that have virtual stores.

2) Advertisers can link through to external advertising campaigns, real-time market demographics, and advertising efficiency data (ad viewing, GOBS growth and click-through sales, etc.).

The present invention will now be described in more detail with the aid of the figures, exemplary embodiments and detailed disclosure.

BRIEF DESCRIPTION OF THE FIGURES

FIG. 1 shows a generic system architecture according to an embodiment of the present invention.

DETAILED DESCRIPTION OF EXEMPLARY EMBODIMENTS

The present invention embodies a computer implemented system, method and user interface for searching, collecting, organizing and sharing diverse information and media types, such as those found on the Internet.

The method employs graphical objects, GOBS, as collections of Internet information and media. GOBS contain links to the original information and media on the Internet as well as unique data and actionable computer code (hereafter referred to as characteristics). The characteristics preferably evolve over time and can depend on the actions of users across a social network.

Among other things, the system enables end users to customize, organize, and prioritize their own Internet user experience, share it across a social network, and take actions on it, similar to the way users take actions with real world objects (i.e., collect, share, gift, advertise, etc.)

The Internet provides a wealth of data to users. However, the way in which user's can collect and utilize this information has been limited and is often not intuitive. For example, easily collecting and sharing information requires numerous user actions and usage of multiple computer programs. The present invention allows users to more easily collect, share and take action on the data found on the Internet.

An aspect of the present invention is the concept of GOBS. GOBS is an acronym for Graphical Objects Bonding Society. GOBS are preferably graphical icons or pictures in a user interface. GOBS are then linked to data in a database or repository via a service such as an Internet cloud service. For simplicity's sake, the plural of these objects is referred to as GOBS and the singular of these objects as a gob. Each gob represents a unique entity such as a person, place, space, organization, or object.

Each gob is comprised of a selection of the following data:
1) a graphical image representing an entity, the entity being for example a person, place, space, organization, or object.
2) links to data that are related to the entity; for example, the links can be a URL, GPS coordinates, RSS feeds, etc.
3) computer instructions that enable a user to directly take an action related to the gob; for example, sending a message to a person gob, joining an organization gob, etc. These actions are dependent on the type of gob and can be unique to a given gob.
4) user generated data related to a given gob; for example, who has collected it, who has shared it, what other GOBS has it been linked to, comments, tags and ratings made about a gob, etc.
5) computer instructions that enable a gob to interact and influence other GOBS; for example, the ability to add a new view to a gob, modify an existing view (i.e., add a Twitter feed or Facebook feed to a user's MyGobs feed) or influence a characteristic of one or more other GOBS.
6) a unique gob ID.

A complete gob according to an embodiment of the present invention contains at least all of the above mentioned information. However, a gob can contain as little as a unique gob ID, a piece of content selected from data groups 2-5 and a generic graphical image. From that point, the gob can be updated and expanded until it contains enough information to be a complete gob. Therefore, a gob can be anything in-between the minimalist gob and a complete gob.

While a gob can be a static collection of information, it is preferable that the information within a gob is consistently evolving. The information within a gob can be constantly changing, or it can be updated, evolved, expanded, minimized, etc. at predetermined intervals. The predetermined intervals can be determined by the system, operator or user based on their needs or the type of gob concerned. Each gob can have its own predetermined interval or a collection of GOBS can have a common set interval. Additionally, the predetermined interval can change and vary over time.

Therefore during normal operation according to an embodiment of the present invention, when a user accesses a gob they see or use only the latest information available. For example, the views that are available to a user within a gob may include a paid advertisement. This advertisement may be set or it may change based on information contained in, or accessible by, the gob. The information can be, for example, a user trends in the system, a given views becoming popular, or trends and data in the users GOBS network.

Additionally, the actions or computer instructions related to a gob may change. For example, a buy now option in the gob may become accessible once a relationship with the manufacturer is in place. Before that point, the option may only be an alert me when this goes on sale.

Each gob can be thought of as a shell with flexible boundaries. Each gob also has the capability to alone, or in connection with an interface, evolve more or less intuitively to provide a user with the most relevant information available. In order to provide the desired functionality, a system is provided in accordance with the general architecture of FIG. 1.

FIG. 1 shows the following system components, a central database 11 that contains all the data on GOBS, an Internet cloud service 15 that handles data requests for GOBS, and multiple client devices 18 which can be mobile devices and/or computing devices capable of providing a graphical user interface for user data consumption and input. In communication with the central database 11 and the internet cloud service 15 are service servers. The service servers include a user services server 14 which delivers information stored in the GOBS database to the client devices, GOBS creation services server 13 which creates GOBS and an enterprise services server 12 which analyzes the data in the central database 11 and reduces redundancy (i.e., combines GOBS, adds new data to existing GOBS, etc.). An authentication system 17 can be part of the system or can be a third-party service utilized for authentication.

FIG. 1 is a generic system architecture. A system according to the present invention could include a wide variety of variations on the generic system shown. For instance, the central database can be a collection of distributed databases of GOBS in multiple locations, on multiple servers or even on client devices themselves. However, it is preferable that all GOBS data is stored in such a way so that it is universally accessible to the system.

The system can contain some or all of the service servers 12-14 shown. In practice, the service servers can be remote from each other or they can be housed in the same server or computer. Additionally, the functionality of the service servers which will be described herein can be separate or merged together.

GOBS can be created in one of three basic ways: autonomously, by a system creator or by an end user. An end user can create individual GOBS on the client devices, preferably using a client graphical user interface, GUI. A system creator can create single or groups of GOBS either on client devices or on system mainframes, servers or administrative computing devices. GOBS can also be created without direct human interaction by a web crawling service.

The GOBS creation service server 12 is the portion of the system responsible for either creating, or tracking the creation of GOBS in the system. Some of the responsibilities for the GOBS creation service server 12 is to assign unique gob ID's to newly created or newly proposed GOBS, determine a storage location in the GOBS database(s) and manage links between new and existing GOBS. The GOBS creation service server 12 is also the portion of the system responsible for creating GOBS autonomously when such a service is present in the system.

A basic gob is formed when a unique gob ID is combined with a graphical image and a piece of data. The following is an example for a user who wishes to create a gob of themselves. The user either selects or is assigned a gob ID for their new gob. The gob ID can be selected such as a username or from a list of available or predefined gob ID's. The gob ID can be also be collection of numbers and/or characters assigned by the system.

The user also selects a graphical image which they would like to represent their gob. For personal GOBS, the graphical image can be items such as personal photographs, user created avatars or generic images selected from an available set. The graphical image of each gob is preferably, but does not have to be, unique.

The third criteria for a basic GOB is that it contains at least one piece of data selected from the group of data enumerated above. For example, the user could provide links to their social networking pages, links to published articles or blogs that they authored or read, links to tracking software which monitors their location or the location of their property, etc. Once there is a unique gob ID, a graphical image and an acceptable piece of data, the gob is created.

An alternative to the example where a user creates a gob of themselves, a system operator can create a group of GOBS for a desired group of entities. For example, a system operator could create a gob for each individual in a company or organization who does not already have a gob. The system operator can then initiate a notification to the individuals to tell them they have a gob and can now interact with it.

An additional alternative is that the system comprises an autonomous system which crawls the web and creates GOBS for entities which do not already have a gob. Regardless of how, or by whom, a gob was created, it is catalogued and tracked by the GOBS creation service and stored in the GOBS database(s).

Once a gob is created then it is analyzed and maintained by the enterprise services server 12. In order to reduce redundancy and provide the most accurate and relevant information to users, the enterprise services server can analyze newly created GOBS to see if a similar gob exists. For example, an autonomous system creates a gob for an individual based on a link to a telephone directory listing and that same individual then creates their own gob with links to their Facebook page. The enterprise services server can notify the user that a gob with certain information about them already exists and can inquire if the user would like to combine the two GOBS. Alternatively, the enterprise services server can automatically combine information in multiple GOBS if it is determined that multiple GOBS exist for a single entity.

Another function of the enterprise services server 12 is to monitor data contained in existing GOBS. The enterprise service can update and modify information, data and links which are part of GOBS. Additionally, the enterprise service can add new data to GOBS to maintain the most accurate and relevant information. For instance, if a designer has a gob for a specific dress, and that gob is linked to the designers storefront, then if the designer makes a new color of the dress available on the storefront then the enterprise service server can add the new color information to the dress gob. Furthermore, if an individual has linked the dress gob to their individual gob, the enterprise service server can add a notice to the individuals that a new color has become available in said dress.

One of the unique features of the present invention is information such as user preferences, priority and trends are incorporated within or accessible by GOBS. Such data is called characteristics and includes all types of unique data associated with each gob. In one embodiment, the client devices operate a graphical user interface which allows users to cognitively and unconsciously provide and update gob characteristics.

The user services server 14 allows for the delivery and accessibility of information stored in the GOBS database(s) for use in the client devices. Through the user services server users can access information about their own gobs, as well as their GOBS network (friends or friends or friends) and further searchable GOBS. Therefore, through the user services server and the enterprise services server, an individual's gob can be modified based on characteristic data of their GOBS network.

As an example, say there is a gob for a presidential nominee. The gob contains the nominee's complete campaign program and various links to information pertinent to that program. Individuals who are interested in that nominee link the nominee's gob to their own gob. Some of those individuals may add a new link or gob to an issue such as education one day and then to healthcare the next.

Through the cooperation of the user services server and the enterprise services server, the presidential nominee gob can change to display the specific portion of the campaign program directed to education after those individuals update something on their gob about education. The next day when those individuals view the nominee's gob it will display the specific portion of the campaign program directed to healthcare. In this way, the system is intuitive since the individual never entered anywhere that they were currently interested in education, but the system changed the information presented to them based on characteristics of the user gob.

In the present example, the nominee's gob can also display to everyone a specific portion of the campaign program directed to the topic most found in connection with its GOBS network. The enterprise services can monitor and update the nominee's gob at preset time intervals, such as daily or weekly, or continuously so that it may change even by the minute. Such preferences about updates can be chosen by the user or set by the system.

An important factor of the ability for GOBS to provide the most relevant and intuitive information is the cognitive and unconscious information gathered in each client device based on user actions. Therefore, each user interacts with the system on their client device through a user interface. Several types of interfaces can interact with the system at the same time. For instance, mobile devices acting as client devices may have one type of interface while PCs have another and MACs a third.

An interface preferably has multiple types of views. Different information is able to be collected and processed in different user interface views. These views can be broken into two groups, public and private.

Each gob has both private and public views. Private views are those accessible only to the user who is logged into an account, while public views are accessible to all other users such as those that have added the gob to their collection.

Examples of private views are collection views, maintenance views and presentation views. Collection views are those which allow the user to add to or modify the content of their gob. Maintenance views show information and actions for maintaining the gob such as an inbox, statistics & goals as well as settings options. Presentation views show existing content and arrangements such as news feeds, a wall and recommendations. Recommendations can be, for example, recommended content or actions from friends, linked GOBS or the system.

Some examples of public views are presentation views, Interaction views, relationship views and advertisement views. Presentation views are similar to those in the private view and can also include information and statistics about the gob. Interaction views allow those who are not the owner to transact, send messages & content and access external links associated with the gob. Advertisement views show paid or promotional advertising.

Relationship views show connections between the gob and other gobs. Preferably, the relationship view is a graphical view which displays alone, or with the aid of text, information such as how the GOBS are connected, i.e. directly or through the GOBS network. Additionally, the relationship views can show when GOBS were connected and what type of connection they have, i.e. like/dislike, past/present/future interest, slight/strong similarity, etc.

Views can by rendered web pages, electronic media such as video, or computer instructions running locally on the device or at a remote location in the network system. Through views, each gob can provide a tailored experience; allowing users to take unique actions, consume relevant and desired content, or input data.

The current gob that a user is viewing on a client interface is considered to be the focus gob. The focus gob can be indicated on the client interface in a variety of manners. The following is a non-limiting example embodiment of a client interface and some of its functionality.

In an embodiment, the focus gob is indicated on the center left side of the screen. In said embodiment, a user can switch from one view to another by pressing the focus gob once, which switches to the next view. The user can independently choose the order of the views in the Settings view. When the user is in the final view available, pressing the focus gob one time takes the user back to the first view.

In the present embodiment, the user can measure where in the cycle of views he is by the position of a glowing color around the edge of the focus gob. For example, if there are four views for a given gob, the glowing color would be 25% of a half circle shown of around the focus gob. When the first view is displayed, the glowing color would be the top 25% of the edge of the focus gob. If the second view is displayed, the glowing color would be shown on the 26%-50% of the edge of the focus gob. And so forth for additional views. Other graphical means for displaying the relative view position will be recognized by those of ordinary skill in the art.

Views can also contain collections of GOBS, such as relationship views. A user can move a gob in a collection to the focus gob position by, for example, double-tapping in a touch interface or double-clicking in a mouse and keyboard interface on a currently non-focus gob.

A user can navigate back and forth between different gobs by tapping and holding the focus gob and then dragging it to the right, as in the present example the focus gob is always located on the left edge of the screen. This opens a navigation string. The navigation string shows all open or possibly all connected gobs and can be scrolled. The left most gob on the navigation string will always be the gob of the user account logged into the system. GOBS can be reordered on the navigation string by tap and hold until the gobs shimmer, and then dragging and dropping them in the desired location.

GOBS can be closed from the navigation string by tap and hold until the gobs shimmer and then dragging the gob downward. GOBS can also be closed by tap, hold and dragging the focus gob downward.

A user can add a gob to the focus gob's collection by tap, hold and dragging the gob onto the focus gob. A user can also access a menu of actions specific to a gob by tap, hold and releasing a gob.

In certain views, such as collection views, there can be a sliding timeline. Sliding this to a particular date will enlarge the GOBS added to a collection on that date and minimize the other GOBS that were in the collection at that time. GOBS not in the collection at that date can be "grayed" or will not be shown. Double-clicking the date bar on a given date will make all GOBS in a collection the same size.

One aspect of the present invention is to create GOBS, as discussed above, so that as much relevant information about a specific entity and links to further information can be located in a single place, the entities gob. Thanks to this, when a user searches for a specific entity, they are able to find relevant information immediately instead of having to search through a myriad of related and un-related material to find what is relevant.

A further aspect of the present invention is to use GOBS and information about GOBS to deliver highly relevant search and exploration results. If a user knows exactly what they are looking for, say information about a specific model of car, then they can quickly go to that model of car's gob. However, if a user is just looking for a new car but does not know which car to buy yet, the present system can provide the most relevant information and GOBS to the user.

The present system enables an end user to intuitively collect and share information on their personal preferences and priorities through the manner in which GOBS are created, collected, linked and placed in the client interface. This information can then, with or without the express permission of the end user, be used by Internet services and the present system to deliver highly personalized services.

User preference data is collected when users add a gob in the client interface, for example to their collection view. The user preference data can be input in a variety of manners. Such ways of inputting preference data can include when a user specifically selects and inputs preference data such as rating or ranking. Another way is when a user consciously places a gob in a position or portion of the client interface. From the graphical placement and manipulation, i.e. moving, placing, turning, picking up, stacking, un-stacking, etc., of GOBS in relation to a fixed point or other GOBS, preference data is determined from that positioning. Other ways which are more or less unconscious actions of the user, i.e. skipping information, viewing a gob more times than others, spending more time viewing a gob, number of times sharing a gob, who recommended the gob, who the user recommended the gob to, when the user added the gob, if the gob is viewed consistently over time or only for a short period and then left alone, etc. can be used to create preference data as well.

Since preference data can be collected in such a broad variety of manners and associated with such a wide variety of information, topics and gobs, the search experience becomes highly tailored and relevant to the user when utilizing this preference data.

The present system, either the enterprise services server 12 or another portion of the system, processes the data collected on each gob and compares this information to the data for every other gob in a user's collection or GOBS network. A portion of the system, either the same as processes the data or an additional portion of the system, produces user preference data from the raw or processed collected data. The preference data can then be fed to Internet services, third party services, corporate data centers 16 or other portions of the present system for the personalization of those services, preferably via an Internet cloud-based API.

For example, if a user has a gob representing a Ford auto in a "present" section of the client interface and a gob representing a BMW auto in a "future" section, the system could determine an aspirational preference for BMW. If the user then has a third gob representing a Fiat auto in the "present" section, but physically further or ranked less than the Ford, the system could determine a current preference for Ford over Fiat.

In this scenario, the system could feed the auto preference data, preferably with the user's express permission, to a car search service. The service could use this data to deliver search results where BMW, Ford and Fiat (in that order) are prioritized in the search results.

Time data on when a gob placed in a user's collection can also be collected and used by the system. In the system, when objects are placed in the same or similar location, or have otherwise similar preference determining data, the more recently placed gob is measured as having a slightly higher level of preference than the older gob.

In addition to using the data in a user's own collection, the system, preferably the user services server 14 or enterprise services server 12 can also incorporate data from a user's GOBS network. In the above auto example, if the end user has a specific friend in their collection and the friend has an Opel gob in their collection, the car search service could then deliver prioritized search results with Opel before other brands that were not in the original-user's collection.

While the user's gob may only contain auto preference data, for example when the user initially creates their gob or if the user has a sub-user gob only relating to autos, the user's gob can contain a wide variety of preference data. For several reasons, including privacy and system requirements, it is generally not ideal to send or make available all of a user's gob's associated preference data in the auto example.

Therefore, the user's auto preference data is preferably only a portion of a set of preference datas associated with the user. While the portion of the set of preference datas is related to the user's auto preference it can include a wide range of data based from a number of similar or different sources. It can include preference data based on one, some or all of the following; the influence of computer implementable instructions of one or more graphical objects bonding society including the users', a plurality of collected data from the user collected at substantially the same time or over a range of times and preference data associated with other graphical objects bonding society including those whose representative entity are other users or organizations.

In the present auto example, the preference data utilized in the search by the third party can contain data such as how many times the Ford gob is linked in the users GOBS network compared to the Fiat gob. Additionally, if the Ford gob contains or has associated with it preference data for a plurality of users about different cars in their line then that can also be used in delivering the search results. Based on the collective preference data search results can show first the most preferred BMW models available in the closest locations followed by the most preferred Ford models available in the closest locations followed by the most preferred BMW models available in more distant locations followed by the most preferred Fiat models available in the closest locations and so on.

The amount and variety of preference data made available for providing any service, third party service, search result or otherwise modifying the presentation of information to the user can be set by the system, chosen by the user or determined for the user based on user interaction or preference data.

The present system uses preference data similarly to suggest new GOBS for a user to collect. It can do this by analyzing the GOBS in a user's collection and GOBS network. Based on data such as frequency, relevance, time, type, and the user's settings, new GOBS can be suggested to the user to collect in the form of a recommendation messages, top 10 lists or other notification means.

A user can also choose to explore for new GOBS. When exploring, groups of GOBS can be presented in addition to individual GOBS. These groups can be arranged via a pre-established, nested grouping like those found in a lexicon. Within each of these groups, GOBS are preferably presented in a prioritized manner, with those GOBS within a user's GOBS network given prominence.

A number of examples for the use and operation of the present system have been presented herein. These examples are not meant to be limiting in nature but to help explain the concepts and exemplary operation of the system. Those of ordinary skill in the art will recognize countless variations not explicitly enumerated which do not part from the scope of the present invention.

The present system is not limited to the generic system architecture of the figures. The present system can be a single universal system or it can be implemented in local standalone systems which can be optionally connected to the internet or to local intranets. The components of the system can be as shown, more distributed or more integral. Client devices may have a client interface pre-loaded, downloaded on a computer readable storage medium of the device. Alternatively, the client interface may be located on a separate portion of the system and accessible by the client devices. Additionally any portion of the system, such as the service servers, can contain or have access to stored computer implementable instructions on computer readable mediums for causing the portion of the system, another portion of the system or a processor integral to that or other portion of the system to carry out the functionality and methods described herein.

The invention claimed is:

1. A method of operating a system for playing a game, the system having a plurality of client devices with access to a client interface and in communication with a database containing created graphical objects bonding societies, the stored graphical objects bonding societies each containing at least a unique ID and a graphical image representing an entity, the method comprising the computer implemented steps of;
   collecting data from a user with regards to a first graphical objects bonding society stored in the database from the users interaction with the first graphical objects bonding society within the client interface,
   creating new preference data of the user from the collected data,
   including the new preference data with a set of preference datas associated with a second graphical objects bonding society whose representative entity is the user,
   utilizing at least a portion of the set of preference datas which includes said new preference data to modify information presented to the client through the client interface.

2. A method in accordance with claim 1 wherein, the portion of the set of preference datas utilized to modify information presented to the client through the client interface includes preference data based on: said influence of the computer implementable instructions of the at least one other graphical objects bonding society, the influence of the computer implementable instructions of the second graphical objects bonding society, a plurality of collected data from the user and preference data associated with at least one other graphical objects bonding society whose representative entity is another user.

3. A method in accordance with claim 1 wherein,
   utilizing at least a portion of the set of preference datas which includes said new preference data to modify information presented to the client through the client interface includes making the preference data available to a third-party search service, and providing the user with search results from the third-party search service which are based on the preference data.

4. A method in accordance with claim 1 wherein,
   utilizing at least a portion of the set of preference datas which includes said new preference data to modify information presented to the client through the client interface includes providing the user with one or more suggested graphical objects bonding societies based on the preference data.

5. A method in accordance with claim 1 wherein,
   the users interaction with the client interface, from which collected data is collected, is the graphical placement and manipulation of objects in the client interface.

6. A method in accordance with claim 5 wherein,
   at least some of the placed and manipulated objects are graphical images representing graphical objects bonding societies including the first graphical objects bonding society.

7. A method in accordance with claim 1 further comprising the step of,
   updating and modifying some or all of the graphical objects bonding societies in the database continuously or at regular intervals.

8. A method in accordance with claim 1 further comprising the step of,
   creating new graphical objects bonding societies with and without user interaction and storing the newly created graphical objects bonding societies in the database.

9. A method of creating a graphical objects bonding society for an entity in a graphical objects bonding society system, the method comprising the computer implemented steps of;
   assigning a unique ID to the graphical objects bonding society,
   assigning a graphical image to the graphical objects bonding society,
   assigning to the graphical objects bonding society at least one link to data related to said entity, at least one set of computer implementable instructions which enable a user to interact with the graphical objects bonding society, at least one piece of user generated data related to the graphical objects bonding society and at least one set of computer implementable instructions which enable the graphical objects bonding society to interact with other graphical objects bonding societies,
   storing the graphical objects bonding society in a database such that a plurality of users of the graphical objects bonding society system can search, access and interact with the graphical objects bonding society and other graphical objects bonding societies can interact with the graphical objects bonding society,
   determining if another graphical objects bonding society exists in the system for an identical entity and compiling the multiple graphical objects bonding societies for identical entities when it is determined that more than one exists.

10. A method of creating a graphical objects bonding society for an entity in accordance with claim 9, wherein all of the steps are carried out by the system without user input.

11. A graphical objects bonding society system comprising,
- a database containing created graphical objects bonding societies, the stored graphical objects bonding societies each containing at least a unique ID, a graphical image representing an entity, at least one link to data related to said entity and at least one set of computer implementable instructions enabling the graphical objects bonding society to influence another graphical objects bonding society
- a plurality of client devices with access to a client interface and in communication with the database, and
- at least one service server which is capable of collecting data from a user with regards to a first graphical objects bonding society stored in the database from the users interaction with the client interface, creating preference data of the user from the collected data, linking the preference data to a second graphical objects bonding society whose representative entity is the user, utilizing the preference data as input to the computer implementable instructions of at least one other graphical objects bonding society to enable said instructions to influence said other graphical objects bonding society based on said preference data, and utilizing the preference data to modify information presented to the client through the client interface.

12. A graphical objects bonding society system in accordance with claim 11 wherein the at least one service server is further capable of creating a graphical objects bonding society for an entity by;
- assigning a unique ID to the graphical objects bonding society,
- assigning a graphical image to the graphical objects bonding society,
- assigning to the graphical objects bonding society at least one link to data related to said entity, at least one set of computer implementable instructions which enable a user to interact with the graphical objects bonding society, at least one piece of user generated data related to the graphical objects bonding society and at least one set of computer implementable instructions which enable the graphical objects bonding society to interact with other graphical objects bonding societies,
- storing the graphical objects bonding society in the database such that a plurality of users of the graphical objects bonding society system can search, access and interact with the graphical objects bonding society and other graphical objects bonding societies can interact with the graphical objects bonding society,
- determining if another graphical objects bonding society exists in the system for an identical entity and compiling the multiple graphical objects bonding societies for identical entities when it is determined that more than one exists.

13. A graphical objects bonding society system in accordance with claim 12, wherein the database is a central database accessible by the client devices through a cloud service.

14. A graphical objects bonding society system in accordance with claim 12, wherein the system is in communication with third party services and the at least one service server utilizing the preference data to modify information presented to the client through the client interface includes making the preference data available, or sending, to a third-party service, and providing the user with a service from the third-party service which is based on the preference data.

15. A graphical objects bonding society system in accordance with claim 14, wherein the system contains multiple distinct service servers which carry out unique capabilities of the at least one service server.

* * * * *